May 2, 1950 — L. BONNA — 2,506,195

VARIABLE SPEED FRICTION GEARING

Filed April 21, 1948

INVENTOR
LOUIS BONNA,
BY
Robert B. Pearson ATTORNEY

Patented May 2, 1950

2,506,195

UNITED STATES PATENT OFFICE 2,506,195

VARIABLE SPEED FRICTION GEARING

Louis Bonna, Geneva, Switzerland, assignor to "Brevets Aero-Mecaniques S. A.," Geneva, Switzerland, a society of Switzerland Application April 21, 1948, Serial No. 22,293
In Luxemburg May 8, 1947

2 Claims. (Cl. 74—796)

The present invention relates to variable speed friction gearings of the kind including two coaxial discs provided respectively with toric grooves facing each other and forming races for at least one tiltable roller interposed between the bottoms of said grooves. In gearings of this kind, variation of inclination of this roller permits of varying the gear ratio in a continuous manner. The invention is more specifically concerned with gearings of this type in which the roller is freely mounted both to revolve and to slide on a spindle arranged to remain always in a plane passing through the central axis of the system, i. e. the common axis of revolution of the two toric discs.

The chief object of the present invention is to provide a variable speed gearing of this kind which is better adapted to meet the requirements of practice than those made up to the present time.

For this purpose, according to an essential feature of this invention, the spindle in question is pivotally mounted about an axis at right angles to the above mentioned central axis, on a support which is both slidable in the direction of said central axis, in order to permit of tilting the roller to the desired inclination, and rotatable about said central axis to transmit the drive to the output shaft of the gearing, with which this support is rotationally coupled, the input shaft being arranged to impart to the toric discs a relative rotation with respect to each other.

Figure 1:
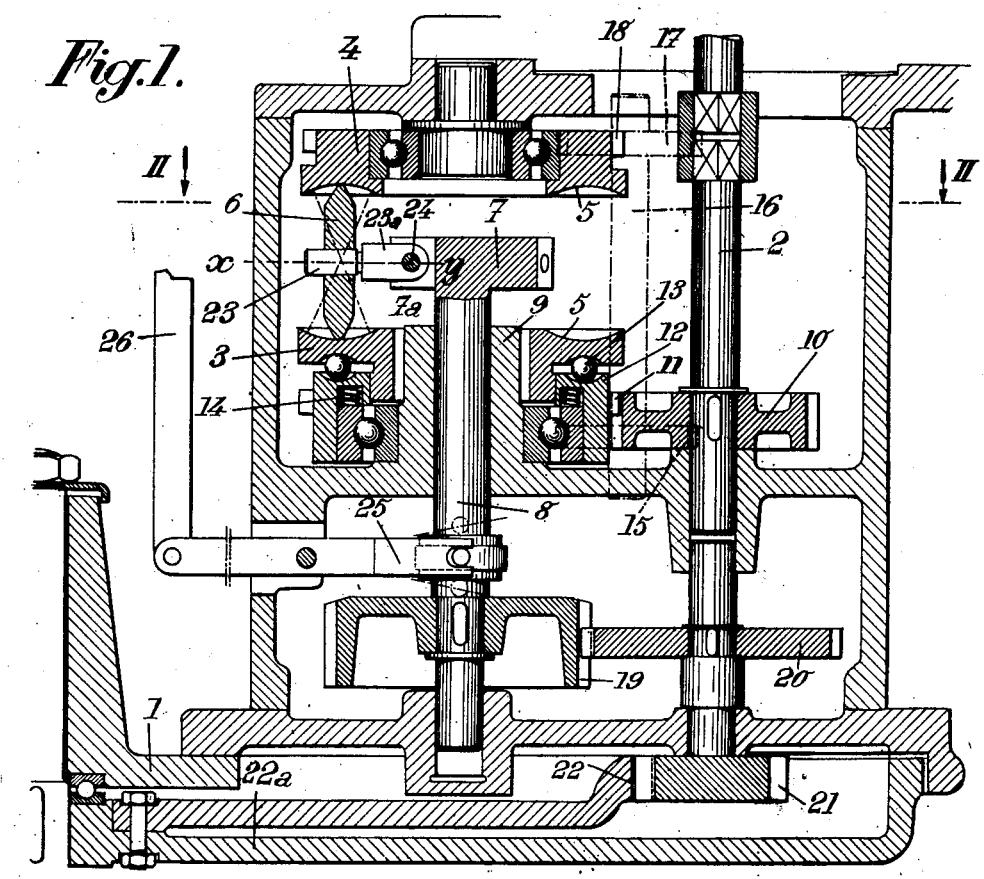
Figure 2:
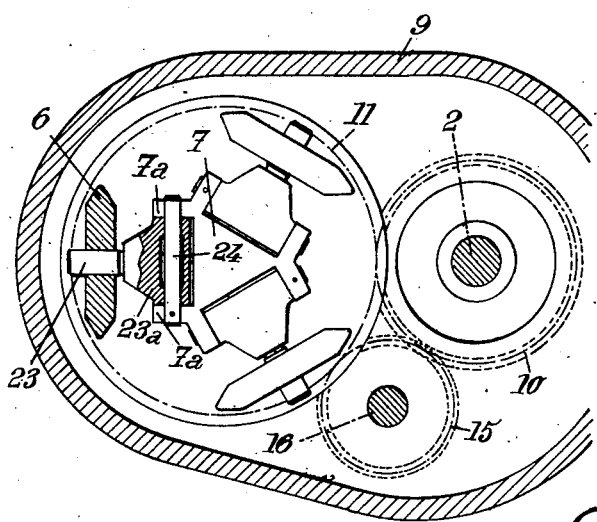

Other features of the invention will appear from the following detailed description of an embodiment of the invention, given merely by way of example, and in which:

Figs. 1 and 2 are, respectively, an axial section and a cross section on the line II—II of Fig. 1, of this embodiment.

In the following description, it will be supposed that the invention is applied to the construction of a revolving platform 1 intended to support, for instance, an automatic firearm, say an anti-aircraft gun, the variable speed gearing being intended to transmit the drive of input shaft 2 to platform 1 in either direction and with any desired gear ratio inside a given range.

The variable speed gearing includes two coaxial discs 3 and 4 in each of which there is provided a torus-shaped groove 5, the distance between said discs being so determined that the centers of curvature of the circular axial sections of grooves 5 coincide substantially.

I interpose, between these discs 3 and 4 at least one friction roller, and preferably a plurality of rollers 6, for instance three, regularly distributed about their support 7, which is rotationally rigid with a shaft 8 coaxial with said discs, journalled in the frame 9 of the apparatus and which constitutes the output shaft of the gearing. These rollers occupy with respect to grooves 5, diametral positions the inclination of which can be modified through adjustment means which will be more explicitly referred to hereinafter.

I provide, between shaft 2, which constitutes the input shaft of the variable speed gearing, and discs 3 and 4, driving means for ensuring relative rotation of said discs with respect to each other. In the preferred embodiment of the invention shown by the drawing, discs 3 and 4 are driven with speeds of revolution equal in absolute value but of opposed directions, through a pinion 10 keyed on shaft 2.

This pinion 10 meshes with a toothed wheel 11 carried by a disc 12 coupled with disc 3 through peripheral torque transmitting balls 13, but slidable in the axial direction with respect to said disc and urged toward it by springs 14, whereby rollers 6 are kept tightly applied between discs 3 and 4 and any possible axial play is automatically taken up.

Pinion 10 further meshes with a transmission pinion 15 fixed on a spindle 16 which carries a pinion 17 identical with pinion 15, said pinion 17 meshing itself with a toothed wheel 18 (similar to wheel 11) carried by disc 4.

Shaft 8 carries, fixed thereon, a pinion 19 cooperating, through transmission gear means 20, 21, with a toothed wheel 22 secured to the fixed base 22a of the platform. Thus, rotation of shaft 8 causes frame 9 in which it is mounted, and consequently platform 1, which is rigid with said frame to rotate about the axis of said fixed wheel 22.

To permit adjustment of the inclination of tiltable rollers 6 for varying the gear ratio of the apparatus, each roller 6 is both freely rotatable and freely slidable in the axial direction with respect to a spindle 23 having its axis located in a radial plane of the apparatus (plane passing through the common axis of revolution of discs 3 and 4 and shaft 8). In the embodiment shown by the drawing, each spindle 23 includes a portion 23a engaged between lugs 7a carried by support 7, a pivot pin 24 extending through said portion 23a and the corresponding lugs 7a.

Control means are provided to impart axial displacements to support 7. In the embodiment shown by the drawing where said support 7 is rigid with the output shaft 8 of the variable speed gearing, this shaft is, for instance, slidable in the axial direction inside certain limits by means of a fork 25 actuated by a link system 26.

Preferably, as shown, the parts are adjusted in such manner that when shaft 8 is in its middle axial position, rollers 6 are vertical, and shaft 8 does not revolve due to the fact that the race tracks of said rollers, respectively in each of the grooves 5 of discs 3 and 4 are of the same length.

This variable speed friction gearing control system works in the following manner:

When output shaft 8 is in its middle axial position, rollers 6 are perpendicular to discs 3 and 4, and, as above stated, transmit no drive to their spindles 23. Support 7, on which said spindles are pivoted, and shaft 8, rigid with said support, therefore remain stationary, same as platform 1. If, now, the operator moves shaft 8 through fork 25 away from this middle axial position, the resulting displacement of support 7 brings spindles 23 into inclined positions and said rollers automatically adjust themselves, by sliding along spindles 23, into a new diametral position in grooves 5. For this new position of rollers 6, their rolling tracks, in each of the grooves 5 of discs 3 and 4 respectively, are of different lengths. These rollers then exert, on their respective spindles, a transverse reaction which produces a rotation of support 7 and shaft 8 in a direction such that the tangential velocities of each roller, at its points of contact with discs 3 and 4, are equal in absolute value. In other words, shaft 8 will be driven in the same direction as the toric disc along which the rolling track is longer and at a speed which depends upon the angle to which the rollers have been tilted. This rotation of shaft 8 finally causes platform 1 to be driven in a direction which depends upon that in which said shaft 8 is rotating.

It will be seen that the direction in which shaft 8 and platform 1 are driven will be determined by the direction of the axial displacement imparted to said shaft 8 from its middle position, the speed that is obtained depending, as to its absolute value, upon the amplitude of this axial displacement.

Such a variable speed gearing has many advantages, in particular that of being strong and reliable due to the simplicity of the means for controlling the inclination of the rollers.

The spindles 23 of the rollers are to be pivoted to any support, either central, as shown, or peripheral, turning together with the receiver or output shaft and capable of axial displacements with respect to the toric discs.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A variable speed gearing which comprises, in combination, two coaxial discs provided respectively with toric raceways and disposed so that said raceways face each other in coaxial relation to each other, at least one tiltable friction roller interposed between said raceways, a support slidable in a direction parallel to the common axis of said discs, a spindle located in a plane passing through said common axis and pivoted to said support about an axis perpendicular to said common axis, said friction roller being journalled on said spindle and freely slidable axially thereon, an input shaft, means operative by said shaft for imparting a relative rotation to said discs with respect to each other, and an output shaft rigid with said support.

2. A variable speed gearing which comprises, in combination, two coaxial discs provided respectively with toric raceways and disposed so that said raceways face each other in coaxial relation to each other, at least one tiltable friction roller interposed between said raceways, a support slidable along the common axis of said discs, a spindle located in a plane passing through said common axis and pivoted to said support about an axis perpendicular to said common axis, said friction roller being journalled on said spindle and freely slidable axially thereon, an input shaft, means operative by said shaft for driving said discs in opposite directions with the same speed in absolute value, and an output shaft rigid with said support.

LOUIS BONNA.

REFERENCES CITED

The following references are of record in the file of this patent:

UNITED STATES PATENTS

| Number | Name | Date |
| --- | --- | --- |
| 1,063,244 | Dieterich | June 3, 1913 |
| 2,325,502 | Georges | July 27, 1943 |

FOREIGN PATENTS

| Number | Country | Date |
| --- | --- | --- |
| 3,910 | Great Britain | Feb. 24, 1905 |